US010867228B2

United States Patent
Lowe

(10) Patent No.: US 10,867,228 B2
(45) Date of Patent: Dec. 15, 2020

(54) POWER OPTIMISATION

(71) Applicant: ZWIPE AS, Oslo (NO)

(72) Inventor: Peter Robert Lowe, Peyton, CO (US)

(73) Assignee: ZWIPE AS, Oslo (NO)

(*) Notice: Subject to any disclaimer, the term of this patent is extended or adjusted under 35 U.S.C. 154(b) by 0 days.

(21) Appl. No.: 15/749,813

(22) PCT Filed: Aug. 5, 2016

(86) PCT No.: PCT/EP2016/068809
§ 371 (c)(1),
(2) Date: Feb. 2, 2018

(87) PCT Pub. No.: WO2017/025481
PCT Pub. Date: Feb. 16, 2017

(65) Prior Publication Data
US 2018/0268274 A1    Sep. 20, 2018

Related U.S. Application Data

(60) Provisional application No. 62/202,189, filed on Aug. 7, 2015.

(30) Foreign Application Priority Data

Aug. 28, 2015 (GB) .................................. 1515361.2

(51) Int. Cl.
*G06K 19/07* (2006.01)
*G06K 7/10* (2006.01)

(52) U.S. Cl.
CPC ..... *G06K 19/0709* (2013.01); *G06K 7/10158* (2013.01); *G06K 19/0708* (2013.01); *G06K 19/0712* (2013.01); *G06K 19/0718* (2013.01)

(58) Field of Classification Search
USPC ........................................................ 235/451
See application file for complete search history.

(56) References Cited

U.S. PATENT DOCUMENTS 6,356,738 B1 * 3/2002 Schneider .......... G06K 19/0701
340/505
2002/0097144 A1    7/2002 Collins
(Continued)

FOREIGN PATENT DOCUMENTS

| CN | 101910973 A | 12/2010 |
|----|-------------|---------|
| CN | 102620852 A | 8/2012  |
| GB | 2390508 A   | 1/2004  |

OTHER PUBLICATIONS

UK IPO Examination Report for corresponding application GB1515361.2; Report dated Oct. 11, 2017.
(Continued)

*Primary Examiner* — Rafferty D Kelly
(74) *Attorney, Agent, or Firm* — Cantor Colburn LLP

(57) ABSTRACT

A method of power optimisation in an RFID device includes harvesting power from a radio-frequency excitation field using an antenna, powering a biometric authentication unit and an RFID communication module using the harvested power from the antenna; monitoring the voltage of the power supplied to the biometric authentication unit, and controlling a clock speed of a processing unit of the biometric authentication unit based on the monitored voltage by operating the processing unit at a higher clock speed when a high voltage level is detected and at a lower clock speed when a low voltage level is detected.

9 Claims, 5 Drawing Sheets

(56) References Cited

U.S. PATENT DOCUMENTS

| | | |
|---|---|---|
| 2006/0113381 A1 | 6/2006 | Hochstein |
| 2010/0039234 A1* | 2/2010 | Soliven .................... H04B 5/02 340/10.1 |
| 2012/0242453 A1 | 9/2012 | Delgado |
| 2016/0171198 A1* | 6/2016 | John Archibald ...... G06F 21/32 |

OTHER PUBLICATIONS

UK IPO Search Report for corresponding application GB1515361. 2; Report dated Feb. 8, 2016.
International Search Report for corresponding application PCT/EP2016/068809 filed Aug. 5, 2016; Report dated Oct. 10, 2016.
Written Opinion of the International Searching Authority for corresponding application PCT/EP2016/068809 filed Aug. 5, 2016; Report dated Oct. 10, 2016.
CN Search Report; Application No. 2016800433700; 2 pages.

* cited by examiner

POWER OPTIMISATION

TECHNICAL FIELD

The present invention relates to power consumption optimisation in an RFID device, and particularly to power consumption optimisation in a passive RFID device including additional processing components requiring power, such as a biometric sensor.

BACKGROUND

FIG. 1 shows the architecture of a typical passive RFID device 2. A powered RFID reader 4 transmits a signal via an antenna 6, which is typically 13.56 MHz for MIFARE® and DESFire® systems, manufactured by NXP Semiconductors, but may be 125 kHz for lower frequency PROX® products, manufactured by HID Global Corp. This signal is received by an antenna 8 of the RFID device 2, comprising a tuned coil and capacitor, and then passed to an RFID chip 10. The received voltage is rectified by a bridge rectifier 12, and the DC output of the rectifier 12 is provided to power control logic 14 that controls the messaging from the chip 10.

A data output from the control logic 14 is connected to a transistor 16, such as a field effect transistor, that is connected across the antenna 8. By switching on and off the transistor 16, a signal can be transmitted by the RFID device 2 and decoded by suitable control circuits 18 in the reader 4. This type of signalling is known as backscatter modulation or active load modulation, and is characterised by the fact that the reader 4 is used to power the return message to itself.

As used herein, the term "passive RFID device" should be understood to mean an RFID device 2 in which the RFID chip 10 is powered only by energy harvested from an RF excitation field, for example generated by an RFID reader 4. That is to say, a passive RFID device 2 relies on the RF excitation field to supply its power for broadcasting.

It has been proposed to incorporate a biometric sensor, such a fingerprint scanner, into a passive RFID device. However, a biometric sensor has relatively high power requirements and so careful management of this power consumption is required.

BRIEF SUMMARY

Viewed from a first aspect, the present invention provides a method comprising: harvesting power from a radio-frequency excitation field using an antenna; powering a processing unit using the harvested power from the antenna; monitoring the power supplied to the processing unit; and controlling a clock speed of the processing unit based on a monitored level of the power.

It is difficult to know at the design stage how much power can be drawn from an excitation source because the available power is variable and cannot be controlled. This variation may be caused by different types of field source, as well as variable conditions when harvesting power, such as the distance from the source and the angle of the antenna relative to the excitation filed. If a processing unit having a constant clock speed is used, then the clock speed must be chosen conservatively to minimise the times when the system is inoperable (due to insufficient power), but doing so decreases the available processing speed of the processing unit.

In accordance with this method, the clock speed of the processing unit can be controlled so as to adjust the power consumption of the processing device to match up to the power being harvested. By controlling the speed of the clock of the processing unit, it is possible to ensure that the circuit remains operational, even when only low power is available, whilst still allowing high clock speeds (and hence fast processing) when higher levels of power are available. Thus, the controlling preferably includes operating the processing unit at a higher clock speed when a high power level is detected and at a lower clock speed when a low power level is detected In a preferred embodiment, the processing unit is in a biometric authentication unit/module, and preferably a fingerprint authentication unit/module, although it will be appreciated that alternative forms of biometric verification may instead be used, such as EKG. Biometric authentication is a highly complex process that can require large amounts of data processing, but is also time sensitive in that a person does not wish to wait for a long time while authentication takes place. Thus, whilst the method may be applicable to any use of the processing unit, biometric authentication particularly benefits from this method of optimising power consumption.

The method may further comprise powering a communication module using the harvested power from the antenna at the same time as powering the processing unit. The communication module may use backscatter or active load modulation to communicate via the antenna.

Where, the power harvested is being used to power both the processing unit and the communication module, controlling the power consumption of the processing unit is especially important because excessive power draw by the processing unit could render the communication module inoperable.

Indeed, in one embodiment, the controlling includes operating the processing unit at a clock speed below its maximum clock speed when operating the processing unit at its maximum clock speed would impair operation of the communication module.

In one embodiment, the excitation field is generated by an RFID reader. Preferably the antenna and processing unit are components within a single unit, such as an RFID device. Exemplary RFID devices include an access card, a credit card, a debit card, a pre-pay card, a loyalty card, an identity card, and a cryptographic card The monitored level of the power is preferably a voltage level.

Viewed from a second aspect, the present invention also provides a device comprising: an antenna for receiving and harvesting power from a radio-frequency signal; a processing unit powered by the antenna, the processing unit having a variable clock speed; a sensor for monitoring the power supplied to the processing unit; and clock speed control logic for controlling a clock speed of the processing unit based on a monitored level of the power.

Thus, a passive processing device (i.e. powered by energy harvested from the RF field) is provided that may facilitate the above method of power consumption optimisation. The device is preferably an RFID device.

In a preferred embodiment, device is a biometric device and the processing unit is a biometric authentication unit/module, and preferably a fingerprint authentication unit/module.

Preferably, the controlling includes operating the processing unit at a higher clock speed when a high power level is detected and at a lower clock speed when a low power level is detected The device may further comprise a communication module powered by the harvested power from the antenna. The communication module preferably uses backscatter or active load modulation to communicate via the antenna.

In this embodiment, the controlling performed by the control logic preferably includes operating the processing unit at a clock speed below its maximum clock speed when operating the processing unit at its maximum clock speed would impair operation of the communication module It will be appreciated that all of the above described preferred features of the device apply also to the method, and vice versa, either individually or in combination.

BRIEF DESCRIPTION OF THE DRAWINGS

Certain preferred embodiments of the present invention will now be described in greater detail, by way of example only and with reference to the accompanying Figures, in which.

DETAILED DESCRIPTION

Figure 1:
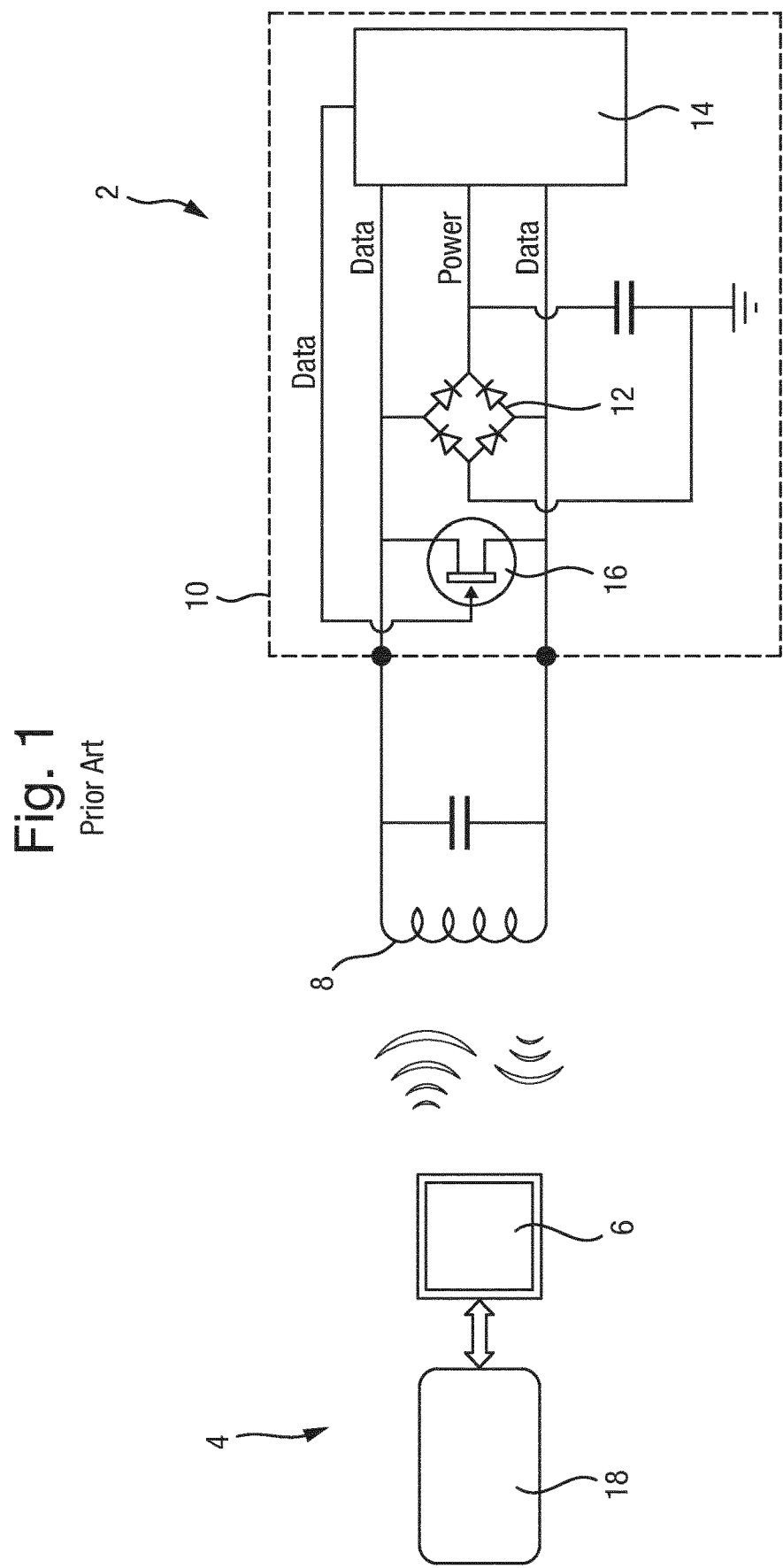
FIG. 1 illustrates a circuit for a prior art passive RFID device.
Figure 2:
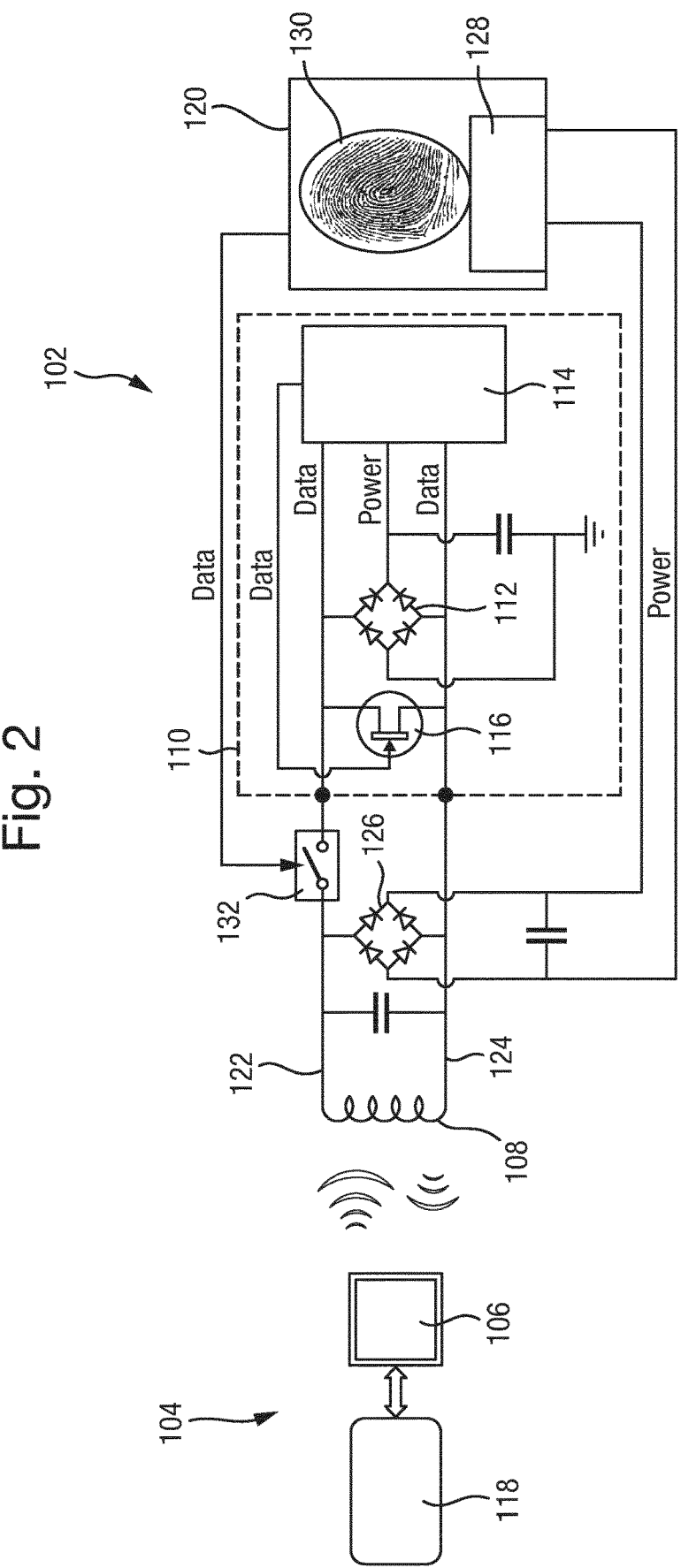
FIG. 2 illustrates a circuit for a passive RFID device incorporating a fingerprint scanner.

FIG. 2 shows the architecture of an RFID reader 104 and a passive RFID device 102, which is a variation of the prior art passive RFID device 2 shown in FIG. 1. The RFID device 102 shown in FIG. 2 has been adapted to include a fingerprint authentication engine 120.

The RFID reader 104 is a conventional RFID reader, and is configured to generate an RF excitation field using a reader antenna 106. The reader antenna 106 further receives incoming RF signals from the RFID device 102, which are decoded by control circuits 118 within the RFID reader 104.

The RFID device 102 comprises an antenna 108 for receiving an RF (radio-frequency) signal, a passive RFID chip 110 powered by the antenna 108, and a passive fingerprint authentication engine 120 powered by the antenna 108.

The antenna 108 comprises a tuned circuit, in this arrangement including an induction coil and a capacitor, tuned to receive an RF signal from the RFID reader 104. When exposed to the excitation field generated by the RFID reader 104, a voltage is induced across the antenna 108. The antenna 108 has first and second end output lines 122, 124, one at each end of the antenna 108, which constitute a pair of terminals.

The output lines 122, 124 of the antenna 108 are connected to the fingerprint authentication engine 120 to provide power to the fingerprint authentication engine 120. In this arrangement, a rectifier 126 is provided to rectify the AC voltage received by the antenna 108. The rectified DC voltage is smoothed using a smoothing capacitor and supplied to the fingerprint authentication engine 120.

Figure 5:
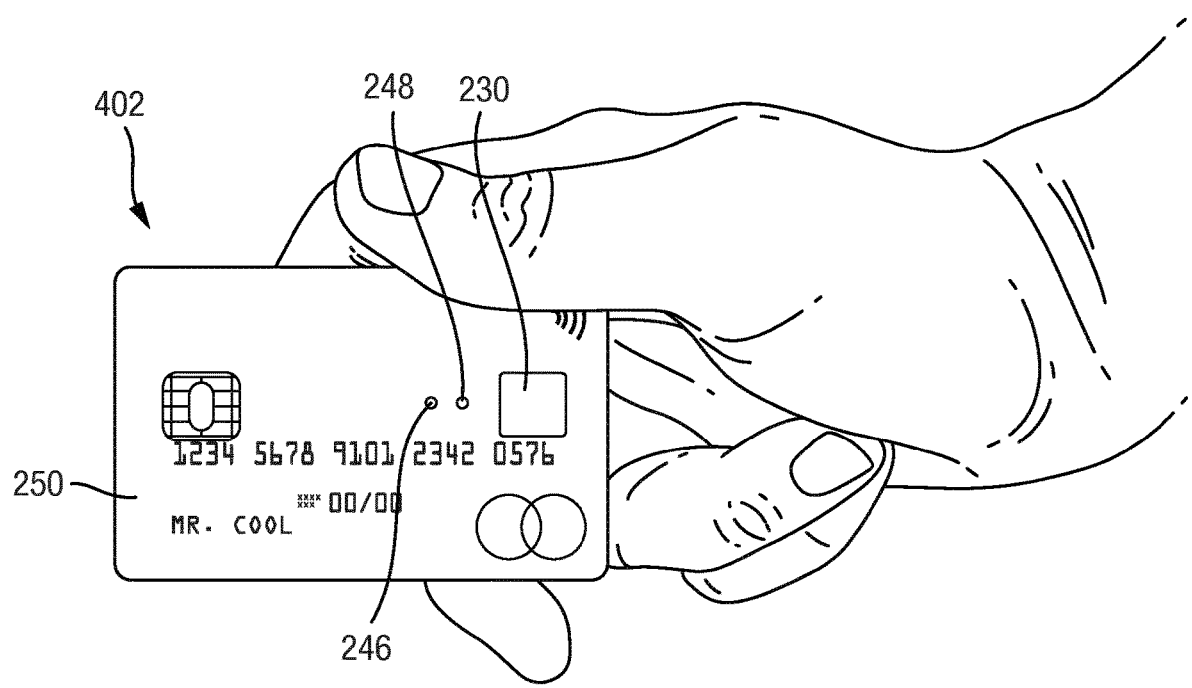
FIG. 5 illustrates a smartcard for incorporating the circuit of FIG. 3 or 4.

The fingerprint authentication engine 120 includes a processing unit 128 and a fingerprint reader 130. The fingerprint sensor 130 of the fingerprint authorisation engine 120, which can be an area fingerprint sensor 130, is fitted so as to be exposed from a laminated card body 250 as shown in FIG. 5. The fingerprint authentication engine 120 is passive, and hence is powered only by the voltage output from the antenna 108.

The fingerprint authentication engine 120 is arranged to scan a finger or thumb presented to the fingerprint reader 130 and to compare the scanned fingerprint of the finger or thumb to pre-stored fingerprint data using the processing unit 128. A determination is then made as to whether the scanned fingerprint matches the pre-stored fingerprint data. The card may provide an indication of successful authorisation using a suitable indicator, such as LEDs 246, 248 embedded within the card body 250.

If a match is determined, then the RFID chip 110 is authorised to transmit a signal to the RFID reader 104. In the FIG. 2 arrangement, this is achieved by closing a switch 132 to connect the RFID chip 110 to the antenna 108. The RFID chip 110 is conventional and operates in the same manner as the RFID chip 10 shown in FIG. 1 to broadcast a signal via the antenna 108 using backscatter or active load modulation by switch on and off a transistor 116.

In this arrangement, the power for the RFID chip 110 and the fingerprint authentication engine 120 is harvested from the excitation field generated by the RFID reader 104. It is important that the power drawn by these circuits be carefully managed, or else communication could break down. If the excitation field is over loaded, then the RFID chip 110 could receive a power signal that is too small to be used.

Figure 3:
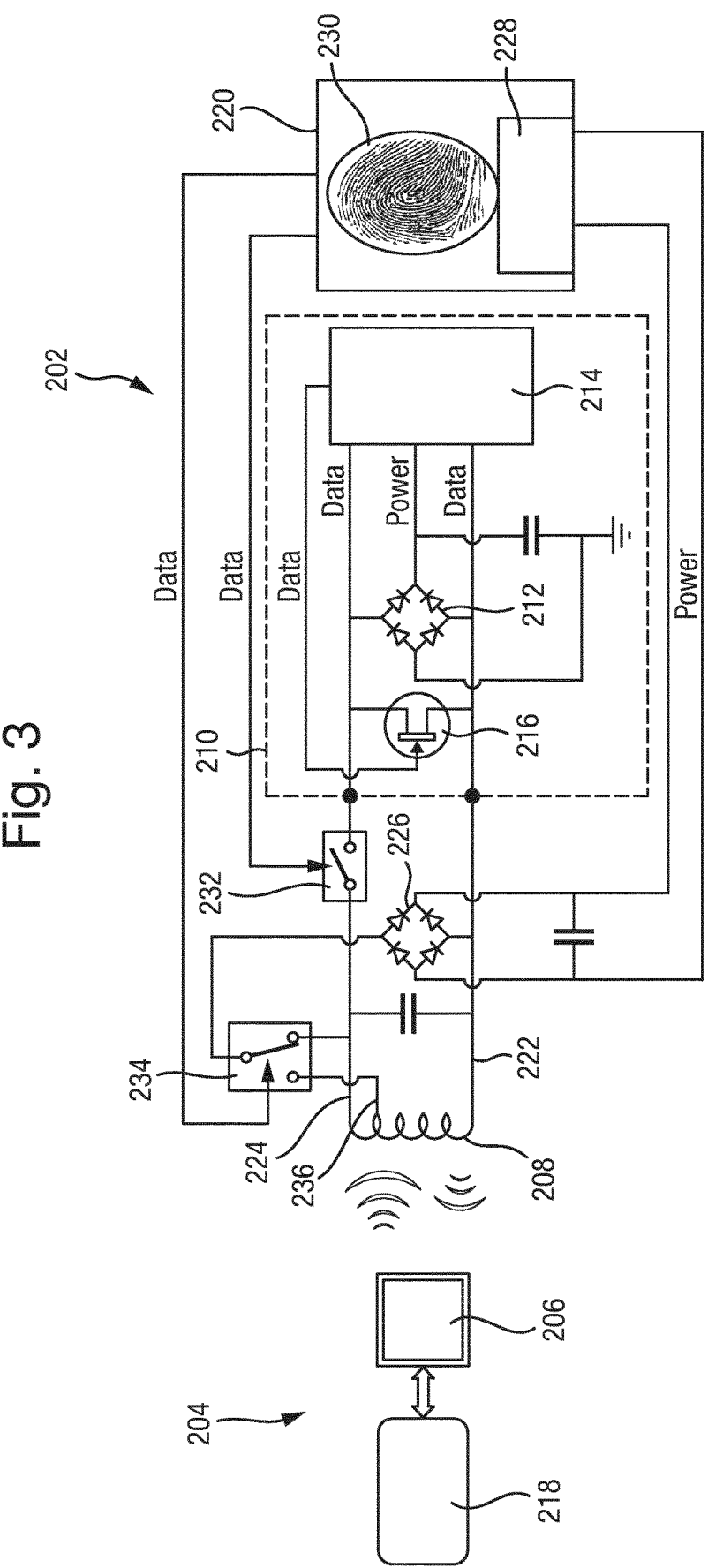
FIG. 3 illustrates a circuit for a passive RFID device incorporating a fingerprint scanner and having improved power load management.

FIG. 3 shows the architecture of an RFID reader 204 and a passive RFID device 202, which is a variation of the passive RFID device 2 shown in FIG. 2. The RFID device 202 shown in FIG. 3 has been adapted to more efficiently handle power distribution within the circuit.

The RFID device 202 and RFID reader 204 shown in FIG. 3 are similar to those shown in FIG. 2 and components corresponding to those shown in FIG. 2 share the same reference numeral, incremented by 100. To avoid repetition, only the differences between these arrangements will be discussed below. The discussion of the components shown in FIG. 2 otherwise applies also to the corresponding components shown in FIG. 3.

The power drawn by the fingerprint authentication engine 220 varies with the part of the cycle that device 202 is in. During fingerprint sensing and matching (a first mode of operation) the power draw of the fingerprint authentication engine 220 is at its highest. During the time that the RFID chip 210 is powered and is communicating to the reader 204 (a second mode of operation), the power draw of the fingerprint authentication engine 220 is relatively low.

The RFID device 202 shown in FIG. 3 further includes a middle output line 236 connected at to the antenna 108 at a location between its ends. Thus, the first end output line 222 and the middle output line 236 constitute a second pair of terminals.

The circuit further includes a power control switch 234 having a first and a second state. In the first state the fingerprint authentication engine 220 is powered by the voltage generated across the first pair of terminals 222, 224, and when the power control switch 234 is in the second state, by the voltage generated across the first pair of terminals 222, 232. In this arrangement, the first end line 222 is always connected to the rectifier 226 and the power control switch 234 alternately connects either the second end output line 224 to the rectifier 226, in a first state (shown in FIG. 3), or the middle output line 232 to the rectifier 226, in a second state. However, it will be apparent that many alternate switching configurations could be used to achieve the same effect.

The circuit includes control logic, for example in the fingerprint authorisation engine 220, configured to move the power control switch 234 to the first state during fingerprint reading and matching and to the second state during communication between the RFID chip 210 and the reader 204.

This arrangement provides a valuable improvement that can be made to ensure that sufficient power is provided to the RFID chip 210 during transmission. Thus, when the power control switch 234, which in this embodiment is under the control of the processing unit 228 in the fingerprint authentication engine 220, is in the first position, the full power signal is drawn from the antenna 208 by the fingerprint authentication engine 220, and when the power control switch 234 is in the second position, only a fraction of the antenna 208 signal is drawn by the fingerprint authentication engine 220.

Figure 4:
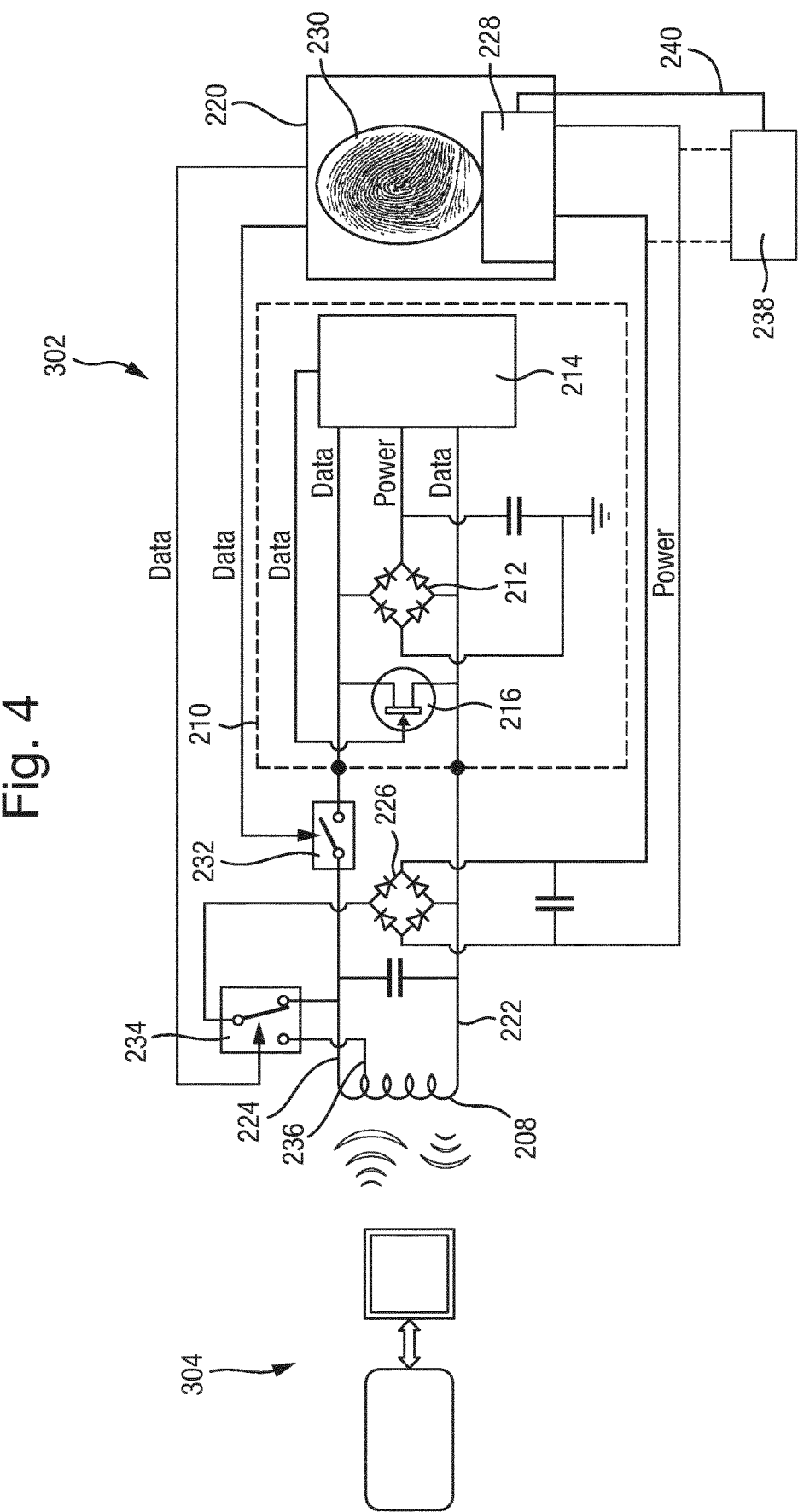
FIG. 4 illustrates a circuit for a passive RFID device incorporating a fingerprint scanner and having improved power load management and clock speed optimisation.

FIG. 4 shows the architecture of an RFID reader 304 and a passive RFID device 302, which is a variation of the passive RFID device 202 shown in FIG. 3. The RFID device 302 shown in FIG. 4 has been adapted to adjust a clock speed of the processing unit 228 in order to optimise power consumption within the circuit.

The RFID device 302 and RFID reader 304 shown in FIG. 4 are similar to those shown in FIG. 3, and components corresponding to those shown in FIG. 3 share the same reference numeral. To avoid repetition, only the differences between these arrangements will be discussed below. The discussion of the components shown in FIG. 3 otherwise applies also to the corresponding components shown in FIG. 4.

Care must be taken when drawing power harvested by the antenna 208 from the excitation signal. If too much power is drawn, then messages from the RFID reader 304 to the RFID device 302 may not be received, or the backscatter/active load signalling scheme can fail and messages from the RFID device 302 to the RFID reader 304 may not be transmitted.

When designing an RFID device 302, it is difficult to know how much power can be drawn from the excitation source because the available power is variable and cannot be controlled. This variation may be caused by different types of RFID readers 304, and variable conditions when harvesting power, such as the distance from the RFID reader 304 and the angle of the antenna 208 relative to the excitation filed of the RFID reader 304.

In this embodiment, the processing unit 228 is a microprocessor having a built-in clock circuit, which is operable at different frequencies. An example of such a microprocessor is the Atmel® ATSAM4S8B microcontroller. It is desirable to operate the processing unit 228 at a high clock speed in order to minimise processing times for the fingerprint matching process. However, a processing unit 228 of this type consumes more power when it is operated at a high clock speed, which could disrupt communication if the harvested power is low.

By controlling the speed of the clock of the processing unit 228, it is possible to ensure that the circuit remains operational, even when only low power levels are available, whilst still allowing high clock speeds (and hence fast processing) when higher levels of power are available.

To achieve this, the RFID device 302 further comprises clock control logic for adjusting a clock speed of the processing unit 228 of the fingerprint authentication engine 220. The processing unit 228 is configured to change clock speeds under the control of a logic signal from the clock control logic. The clock control logic is implemented as software executed by the fingerprint authentication unit 220, but could alternatively be implemented using hardware or as software in a separate component.

The RFID device 302 comprises a voltage sensor 238 positioned to measure the voltage supplied to the fingerprint authentication unit 220, i.e. the voltage from the bridge rectifier 226. The sensor 238 may comprise an analog-to-digital (A/D) converter and a power processor for connecting the raw signal from the A/D converter to the processing unit 228. The power processor may function to regulate the voltage, to clip the voltage to keep it below a safe level for the control logic or merely to pass it on unchanged.

The output of sensor 238 is a digital signal which is connected to the control logic 228 through connection 240 in such a way that it is used to control the speed of the clock of the processing unit 228. When the power drawn from the antenna 208 is high, then the output of the sensor 238 will also be high. When the power from the antenna 208 is low then the output of the sensor 229 will be low.

The clock control logic is configured such that, if the power from the antenna 208 is low then the control logic changes the clock speed of the processing unit 228 making it go slower. Correspondingly, when there are higher levels of power from the antenna 208, then the processing unit 228 may be made to run faster.

The result of these measures is that, if the RFID device 302 is put in a weak RF field, then the clock runs relatively slowly and the fingerprint evaluation takes longer than if the field was high and the clock frequency was relatively higher.

Whilst the clock control logic has been applied to an RFID device 202 including power load management as discussed with reference to FIG. 3, it will be appreciated that the power consumption optimisation may be similarly implemented in the processing unit 128 of the RFID device 102 of the FIG. 2 embodiment by addition of a suitable voltage sensor and clock control logic.

Furthermore, whilst the preferred embodiments illustrate power consumption optimisation in the processing unit 228 of a fingerprint authentication unit 230, it should be appreciated that this technique is applicable more broadly to other modules including processing units 228 performing complex processing operations, for example other biometric authentication unit.

Yet further, whilst the fingerprint authentication engine 220 has been illustrated as a single component, it will be appreciate that it may be implemented in a distributed arrangement comprising multiple components, for example having two or more processing units in different locations. Each such processing unit may use the power load management discussed above, or only some of the processors may do so.

The passive RFID devices 202, 302 are preferably embodied as a laminated smartcard 402, such as illustrated in FIG. 5. The laminated body 250 encases all of the components of the circuit. The body 250 has a width of 86 mm, a height of 54 mm and a thickness of 0.76 mm, although the thickness may be increased to accommodate the fingerprint authentication engine 220. More generally the RFID device 402 may comply with ISO 7816, which is the specification for a smartcard.

The invention claimed is:

1. A method of operating an RFID device comprising:
 harvesting power in the RFID device from a radio-frequency excitation field from an RFID reader that is separate from the RFID device using an antenna of the RFID device;

powering the RFID device, which includes powering power control logic and biometric authentication module, using the harvested power from the antenna;

monitoring a level of the power supplied to the RFID device with a voltage sensor on board the RFID device, to determine when the power drawn by the antenna is high or low while performing a biometric evaluation; and controlling a clock speed for processing of the biometric authentication module based on a signal received from the voltage sensor while monitoring the level of the power, wherein controlling the clock speed includes running at a slower clock speed upon determining the power drawn by the antenna is low from the monitoring by the voltage sensor, thereby slowing the biometric evaluation relative to executing the biometric evaluation with a higher clock speed when the power drawn by the antenna is high, and when the level of the power drawn by the antenna is higher, the clock speed is made to run higher, whereby the controlling includes performing the biometric evaluation at the higher clock speed when the power drawn by the antenna is detected as being high and performing the biometric evaluation at the slower clock speed when the level of the power drawn by the antenna is detected as being low.

2. A method according to claim 1, wherein the biometric authentication module is a fingerprint authentication module.

3. A method according to claim 1, further comprising:
powering a communication module of the RFID device using the harvested power from the antenna at the same time as controlling the clock speed.

4. A method according to claim 3, wherein the controlling includes processing at the clock speed below a maximum clock speed when processing at the maximum clock speed would impair operation of the communication module.

5. An RFID device comprising:
an antenna for receiving and harvesting power from a radio-frequency signal from an RFID reader that is separate from the RFID device, wherein the RFID device, which includes power control logic and a biometric authentication module, is powered using the harvested power from the antenna;

a voltage sensor configured to monitor a level of the power supplied to the RFID device to determine when the power drawn by the antenna is high or low while performing a biometric evaluation; and clock speed control logic for controlling a clock speed for processing of the biometric authentication module based on a signal received from the voltage sensor while monitoring the level of the power, wherein controlling the clock speed includes running at a slower clock speed upon determining the power drawn by the antenna is low from the monitoring by the voltage sensor, thereby slowing the biometric evaluation relative to executing the biometric evaluation with a higher clock speed when the power drawn by the antenna is high, and when the level of the power drawn by the antenna is higher, the clock speed is made to run higher, whereby the controlling includes performing the biometric evaluation at the higher clock speed when the power drawn by the antenna is detected as being high and performing the biometric evaluation at the slower clock speed when the level of the power drawn by the antenna is detected as being low.

6. A device according to claim 5, wherein the biometric authentication module is a fingerprint authentication module.

7. A device according to claim 5, further comprising:
a communication module powered by the harvested power from the antenna.

8. A device according to claim 7, wherein the communication module uses active load modulation to communicate via the antenna.

9. A device according to claim 7, wherein the controlling includes processing at the clock speed below a maximum clock speed when processing at the maximum clock speed would impair operation of the communication module.

* * * * *